R. B. MORTON.
MOTOR VEHICLE.
APPLICATION FILED OCT. 1, 1912.
1,162,640.
Patented Nov. 30, 1915.
3 SHEETS—SHEET 3.
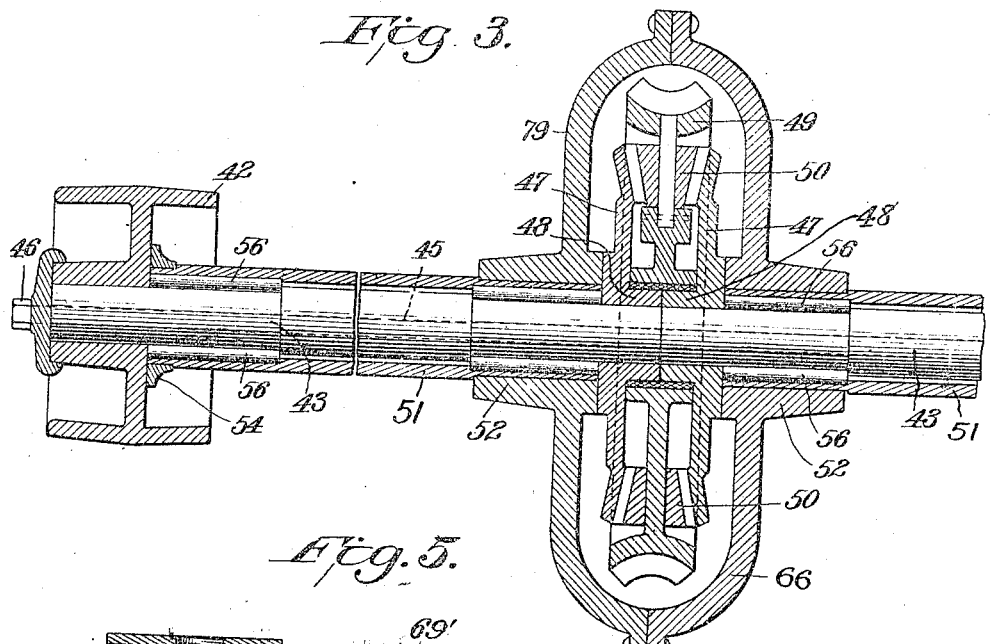
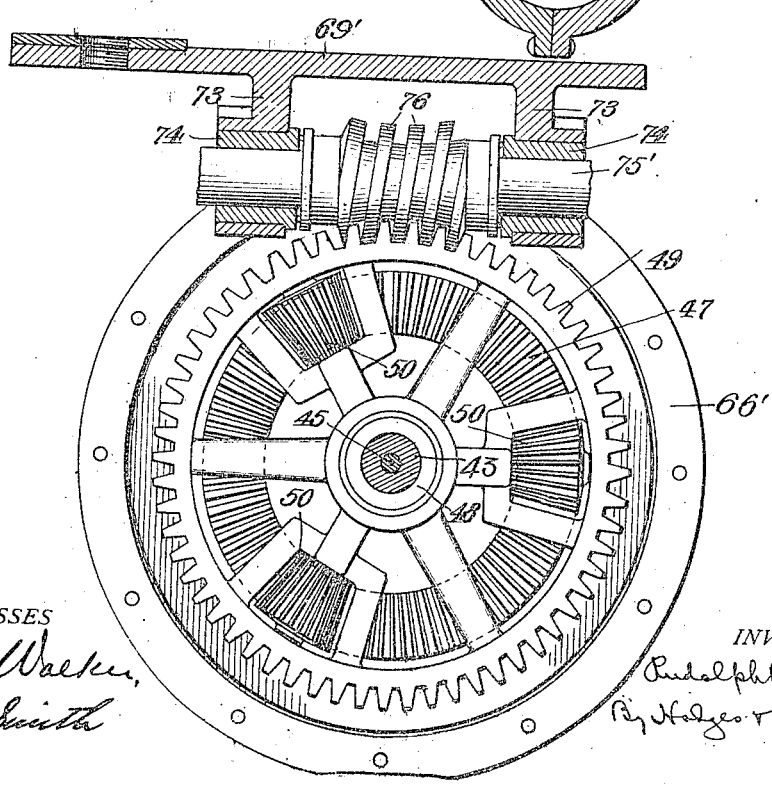

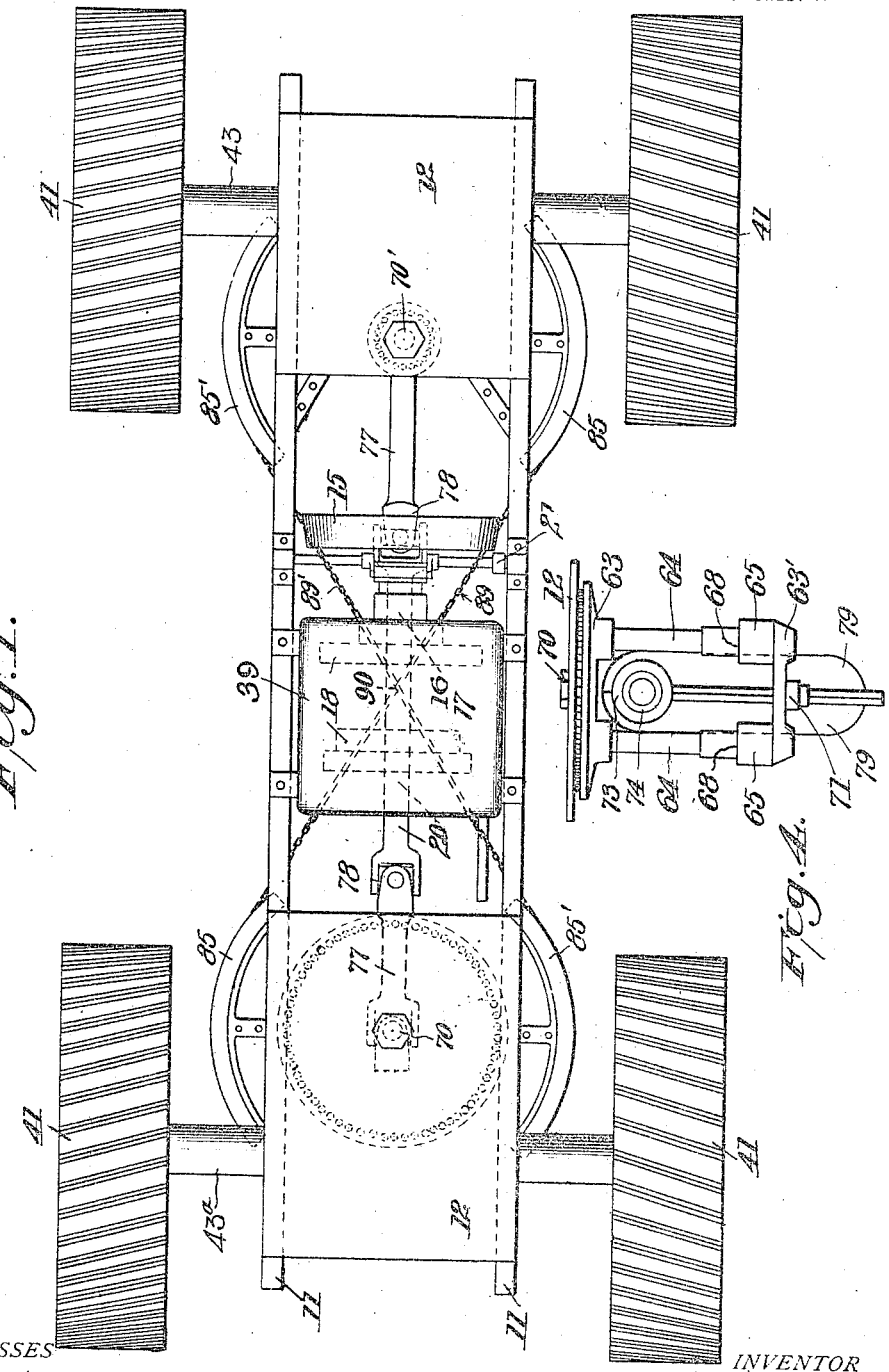

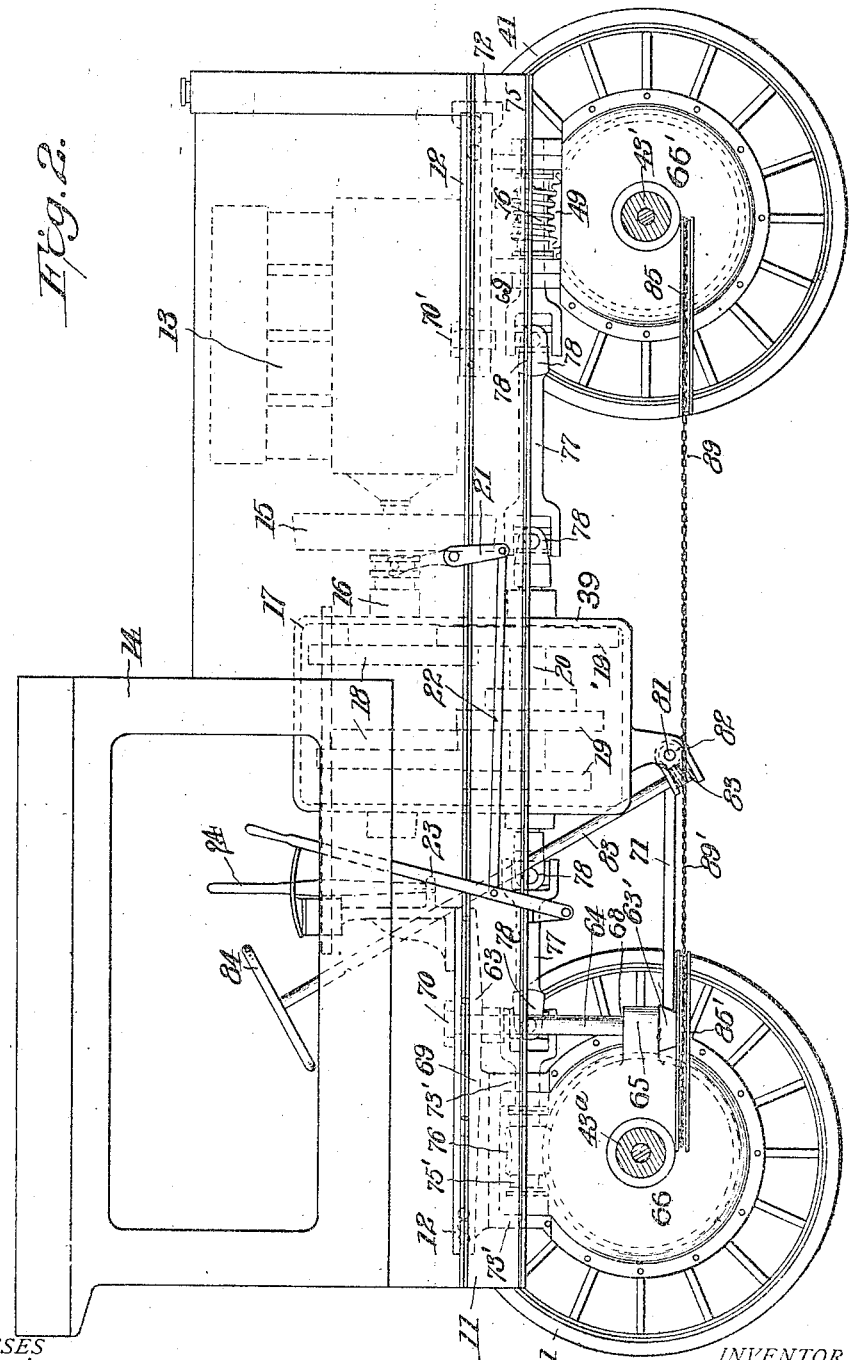

UNITED STATES PATENT OFFICE.

RUDOLPH B. MORTON, OF CLEVELAND, OHIO.

MOTOR-VEHICLE.

1,162,640.   Specification of Letters Patent.   Patented Nov. 30, 1915.

Application filed October 1, 1912. Serial No. 723,451.

*To all whom it may concern:*

Be it known that I, RUDOLPH B. MORTON, a citizen of the United States, residing at Cleveland, in the county of Cuyahoga and State of Ohio, have invented new and useful Improvements in Motor-Vehicles, of which the following is a specification.

This invention pertains to motor vehicles and relates more particularly to that class of such vehicles generally known as traction engines, although not limited in this particular.

One of the objects of the invention is to provide a motor vehicle having four driving wheels so arranged as to materially increase the efficiency of the machine and effect a reduction in the weight usually required in motor vehicles, and particularly those utilized for traction engine purposes.

A further object is to provide improved means by which power is applied to each and all of the traction wheels.

A further object is to provide improved means for applying the driving power directly to the axles on which the wheels are mounted so that either or both axles may swing or turn in steering without bringing undue strains upon the driving mechanism, and to provide a high ground clearance.

A further object is to provide means for permitting the wheels to accommodate themselves to inequalities in the ground over which the vehicle is traveling and without bringing torsional strains on the drive shaft or tending to throw the latter out of alinement.

The invention will be hereinafter fully set forth and particularly pointed out in the claims.

In the accompanying drawings:—Figure 1 is a plan view of a motor vehicle constructed in accordance with my invention. Fig. 2 is a side view thereof. Fig. 3 is a horizontal sectional view illustrating one of the axles and its adjuncts. Fig. 4 is a detail front elevation illustrating one of the sub-frames. Fig. 5 is a longitudinal sectional view illustrating the means for supporting the drive shaft.

Referring to the drawings, the main frame of my improved motor vehicle may be of any suitable or preferred construction. The same is illustrated as made up of longitudinal side bars 11, preferably formed of channel iron, and united near their ends by plates 12, said side bars being sufficiently braced in any suitable manner. The engine 13 is located at the forward end of the frame and the cab 14, to be occupied by the operator, is at the rear end of the frame. The engine is connected by a suitable clutch 15 with the engine shaft 16 mounted to rotate in a transmission case 17 supported by the side bars of the frame. The shiftable gears 18 of a change speed mechanism, are mounted upon the engine shaft and are adapted to mesh with gears 19 on a transmission shaft 20. The clutch 15 and the change speed mechanism may be of any preferred construction, the clutch illustrated being operated by a crank 21 pivotally mounted on the main frame, and connected by a rod 22, to an operating lever 23 pivotally supported in a position to be conveniently reached by the operator within the cab. The shiftable change speed gears 18 are also illustrated as being operated through suitable connections by a hand lever 24 located conveniently with respect to the operator's position within the cab.

The traction wheels 41 may be of any preferred type and each provided with a hub 42 secured to an axle section 43 of the front and rear axles 43′, 43ª respectively. Each axle is formed of two of such axle sections 43, meeting at their inner ends. Each axle section is provided with a longitudinal bore through which is passed a rod 45 having nuts 46 on its ends, said nuts serving to prevent separation of the axle sections, and also to resist the end thrust of the differential gearing sustained on the axle sections. To the inner end of each axle section 43 of the front and rear axles respectively, is rigidly secured a bevel gear 47, the bevel gears of the sections of each axle facing each other and forming opposite members of a differential gearing. Each bevel gear 47 is provided with a hub portion 48, the hub portions of the two adjacent bevel gears serving as a journal for a worm gear 49 which carries the planetary pinions 50 meshing with the gears 47, and coöperating with the latter to complete the differential gearing. Each axle section 43 is inclosed within a tube or sleeve 51, the inner ends of each sleeve being secured within collars 52, the outer ends of said sleeves extending to the hubs of the wheels 41, and being provided with bands 54 to prevent sand and grit from working down into the moving parts. In order to reduce the friction, suitable roller bearings 56 are provided between the axle sections 43 and the sleeves 51.

The main frame is connected to the front and rear axles by means of trucks. The rear truck comprises a sub-frame formed of end sections 63, 63' united by rods 64 and supporting arms 65, extending from gear inclosing members 66 carried by the collars 52 and provided with sockets adapted to receive said vertical rods, whereby said sub-frame is supported. The rods 64 are provided with annular shoulders 68 adapted to bear upon the upper surfaces of the sockets of arms 65, whereby relative movement of the rods and the supporting frame or yoke is prevented, and the weight of the main frame and sub-frame is supported by the said supporting frame or yoke. The end section 63 of said sub-frame is provided with an overhanging portion 69 which is pivotally connected to the plate 12 of the main frame by means of a bolt 70, forming a turn table construction, antifriction balls or rollers being interposed between said end member 63 and said plate 12. The end section 63' of the rear truck is provided with a depending lug having a pivotal engagement with the rear end of a radius brace 71, the forward end of which is secured to the bottom of case 39 which incloses the gearing. In the front truck the collars 52 carried by the forward axle are also provided with gear inclosing members 66' connected with a plate 69' pivoted to the forward plate 12 of the main frame by means of a bolt 70', the forward end of said plate 69' being supported by a bracket 72 carried by the main frame and provided with a lip upon which said forward end rests. It will be noted that the pivot points 70, 70' are located between the axles 43', 43ª and in line with the longitudinal median line of the frame.

Depending from the plate 69' are two bracket bearings 73 provided with sleeves 74 which receive thrust bearings in which is rotatably supported a shaft 75. The rear sub-frame is also provided with an overhanging portion 69 having brackets 73' in which is mounted a drive shaft 75'. Each drive shaft 75, 75' is provided with a worm 76 meshing with the contiguous worm gear 49. The shafts 75, 75' are each connected with opposite ends of the transmission shaft 20 by flexible connections each comprising a short shaft 77 connected at one end by a universal joint 78 with the adjacent end of the shaft 20, the other end of the shaft 77 being connected by a universal joint 78 with the corresponding end of the shaft 75. The universal joints 78 are in line with the respective pivot bolts 70, 70', so that in steering the machine, the front and rear axles swing with their respective trucks, without excessive strains on the driving shaft, and the perfect and smooth driving of each axle irrespective of its angle with relation to the main frame is accomplished. The shaft 20 also has a telescoping connection with one member of each universal joint 78.

My improved motor vehicle may be steered in various ways. In the drawings, I have disclosed steering mechanism comprising a rotatable drum 81 mounted in suitable bearings carried by the box or case 39, said drum being provided with a worm gear 82 engaged by a worm shaft 83 extending up into the cab of the engine, and provided with a hand wheel 84 for convenient manipulation. Secured to each truck are two opposite segments 85, 85' which swing about the axes of the pivots of the trucks, respectively. Two steering chains 89, 89' are employed and diagonally crossed, with the ends of each chain attached to opposite segments 85 and opposite segments 85', respectively, said chains each engaging the drum 81, one being passed over the top and the other beneath said drum. The arrangement is such that the chains cross each other at the point 90 in advance of the drum 81, in such manner that they will be free from interference of each other as the positions of the axles change. By operating the worm shaft 83 the drum 81 is actuated in one direction or the other, as may be desired, causing the ends of the two axles on one side of the machine, to swing simultaneously toward each other, thereby changing the course of the machine, which may be effected in a comparatively small space. It will be observed that the segments 85, 85' are so arranged that a pulling action exerted upon one side of either of the steering segments 85, 85' will swing both trucks upon their respective pivots.

In operation, the engine is started in the usual manner and when the desired speed gears have been thrown into mesh by manipulation of the lever 23, the clutch is thrown into engagement through manipulation of the lever 21. The result of these manipulations is to impart movement to the transmission shaft 20, and through said shaft the worm gears 49 are rotated. The connections of the worm gears 49 with the axles through the differential gearings effects rotation of the traction wheels 41. Thus it will be seen that power is positively applied to each of the traction wheels which is of particular advantage, especially in traveling over plowed fields, loose and sandy soils, or in mud. It will be further noted that by arranging the engine main shaft and the transmission shaft longitudinally of the machine, and mounting the main frame upon trucks which in turn are carried by the axles, the engine is protected from transverse strains. Consequently its life will be materially lengthened, and the vehicle may be operated in places heretofore considered inaccessible or undesirable because of the injuries likely to result from such strains. Should one wheel on either axle stand higher than the other, owing to inequalities in the ground over which the vehicle is traveling, the truck will swing or pivot around the sleeves 74 of the forward truck, thereby taking up the strains, and relieving the drive shaft of all torsion and tendency to bind so that said shaft will rotate freely at all times.

It will be noted that while I have shown and described my invention as being particularly applicable for a machine of the type commonly known as a traction engine, I do not desire to limit myself in this particular, as my invention may also be used as a motor truck, or an automobile, without departing from the spirit thereof.

Having thus explained the nature of my invention and described an operative manner of constructing and using the same, although without attempting to set forth all of the forms in which it may be made, or all of the forms of its use, what I claim is:—

1. A motor vehicle comprising a body, axles, wheels supporting said axles, a truck comprising rigid members supported by one of said axles, a bearing member connected to said body and provided with depending bearings, a drive shaft mounted in said bearings and connecting said rigid members and said body, means operated by said shaft for driving the contiguous axle, means for actuating said drive shaft, and means for connecting the other axle with said body.

2. A motor vehicle comprising a body, axles, wheels supporting said axles, a truck comprising rigid members supported by one of said axles, a bearing member connected to said body and provided with depending bearings, a drive shaft mounted in said bearings and connecting said rigid members and said body, means operated by said shaft for driving the contiguous axle, a transmission shaft, means for flexibly connecting said transmission shaft and said drive shaft, and means for connecting the other axle with the body.

3. A motor vehicle comprising a body, axles, wheels supporting said axles, a truck pivoted to said body and provided with depending members overhanging one of said axles, a drive shaft supported in said bearings and operatively connected with one of said axles, means for actuating said drive shaft, and means for connecting the other axle to the body.

4. A motor vehicle comprising a body, axles, wheels supporting said axles, a truck pivoted to said body and provided with depending bearings overhanging one of said axles, a drive shaft supported in one of said bearings and operatively connected with said axle, means for pivotally connecting the axle to the drive shaft to permit the axle to swing laterally around the drive shaft as an axis, and means for connecting the other axle to said body.

5. A motor vehicle comprising a body, axles, wheels supporting said axles, a truck supported by one of said axles, bearing members carried by said truck, a drive shaft rotatably supported by said bearing members and operatively connected with said axle, a member supported by said axle and pivotally connected with said bearing members, and means for connecting the other axle to said body.

6. A motor vehicle comprising a body, axles, wheels supporting said axles, a truck supported by one of said axles, bearing members supported by said truck and provided with annular extensions, a drive shaft rotatably mounted in said bearing members and operatively connected with said axle, a member supported by said axle and mounted to swing on said annular extensions, and means for connecting the other axle to said body.

In testimony whereof I have hereunto set my hand in presence of two subscribing witnesses.

RUDOLPH B. MORTON.

Witnesses:
JOSEPH D. ERRICA,
J. B. HOLMDEN.